US010636531B2

(12) United States Patent
Lee et al.

(10) Patent No.: US 10,636,531 B2
(45) Date of Patent: Apr. 28, 2020

(54) INSTALLATION STRUCTURE FOR INSTALLING CONTROL ROD DRIVE MECHANISM AND CABLE SEALING UNIT IN NUCLEAR REACTOR PRESSURE VESSEL

(71) Applicant: KEPCO ENGINEERING & CONSTRUCTION COMPANY, INC., Gyeongsangbuk-do (KR)

(72) Inventors: Won Ho Lee, Goyang-si (KR); Jin Seok Park, Daejeon (KR); Yong Tae Jang, Daejeon (KR); Myoung Goo Lee, Daejeon (KR); Yeon Ho Cho, Daejeon (KR)

(73) Assignee: KEPCO ENGINEERING & CONSTRUCTION COMPANY, INC., Gyeongsangbuk-Do (KR)

( * ) Notice: Subject to any disclaimer, the term of this patent is extended or adjusted under 35 U.S.C. 154(b) by 224 days.

(21) Appl. No.: 15/730,246

(22) Filed: Oct. 11, 2017

(65) Prior Publication Data
US 2018/0102193 A1 Apr. 12, 2018

(30) Foreign Application Priority Data

Oct. 11, 2016 (KR) .......................... 10-2016-0131621

(51) Int. Cl.
*G21C 13/028* (2006.01)
*G21C 7/12* (2006.01)
(Continued)

(52) U.S. Cl.
CPC ............ *G21C 13/028* (2013.01); *G21C 7/12* (2013.01); *G21C 7/14* (2013.01); *G21C 15/22* (2013.01); *Y02E 30/39* (2013.01)

(58) Field of Classification Search
CPC ..... G21C 7/12; G21C 7/14; G21C 7/16; G21C 13/028; G21C 13/032; G21C 13/073
See application file for complete search history.

(56) References Cited

U.S. PATENT DOCUMENTS

2013/0272465 A1* 10/2013 Shargots .................. G21C 7/08
376/228
2013/0287157 A1* 10/2013 Conway ............... G21C 17/116
376/203
2013/0301777 A1* 11/2013 Berthold .............. G21C 17/116
376/228

FOREIGN PATENT DOCUMENTS

EP 0 125 063 B1 8/1988
JP 05-333183 A 12/1993
(Continued)

*Primary Examiner* — Sharon M Davis
(74) *Attorney, Agent, or Firm* — Nixon Peabody LLP; Jeffrey L. Costellia

(57) ABSTRACT

Provided is an installation structure for installing control rod drive mechanisms and cable sealing units in a nuclear reactor pressure vessel. The installation structure includes: a sealing flange having a ring shape and being hermetically coupled to an upper pressure vessel and a lower pressure vessel of the nuclear reactor pressure vessel; a cylindrical tube extending downward vertically from an internal edge of the sealing flange; and a support plate provided horizontally to block a lower end portion of the cylindrical tube. A plurality of mounting holes that penetrate through the sealing flange horizontally are arranged in the sealing flange with a predetermined interval therebetween along a circumferential direction, the cable sealing units are inserted and mounted in the plurality of mounting holes, and the control rod drive mechanisms are installed on the support plate to be supported.

7 Claims, 7 Drawing Sheets

(51) Int. Cl.
*G21C 7/14* (2006.01)
*G21C 15/22* (2006.01)

(56) References Cited

FOREIGN PATENT DOCUMENTS

| | | |
|---|---|---|
| JP | 08-054488 A | 2/1996 |
| KR | 10-1991-0005922 B1 | 8/1991 |
| KR | 10-2015-0106957 A | 9/2015 |
| WO | 2013/162894 A1 | 10/2013 |

* cited by examiner

INSTALLATION STRUCTURE FOR INSTALLING CONTROL ROD DRIVE MECHANISM AND CABLE SEALING UNIT IN NUCLEAR REACTOR PRESSURE VESSEL

CROSS-REFERENCE TO RELATED APPLICATION

This application claims the benefit of Korean Patent Application No. 10-2016-0131621, filed on Oct. 11, 2016, in the Korean Intellectual Property Office, the disclosure of which is incorporated herein in its entirety by reference.

BACKGROUND

1. Field

One or more embodiments relate to an installation structure for installing control rod drive mechanisms and cable sealing units in a nuclear reactor pressure vessel, and more particularly, to an installation structure having a structure, by which control rod drive mechanisms and cable sealing units may be installed together in a nuclear reactor pressure vessel, so that disassembling, assembling, and maintenance processes may be performed easily when replacing nuclear fuel.

2. Description of the Related Art

In general, nuclear fuel assemblies are loaded in a core of a nuclear reactor pressure vessel, and control rod drive mechanisms are installed on an upper portion of a nuclear reactor. A control rod absorbs neutrons in order to adjust a reaction rate of nuclear fuel, a control rod driving shaft is coupled to an upper end portion of the control rod, and the control rod drive mechanism is a device for elevating the control rod driving shaft in vertical direction.

An in-vessel type control rod drive mechanism installed in a nuclear reactor is mainly used in small/medium-sized nuclear reactors. As described above, the in-vessel type control rod drive mechanism is installed in the nuclear reactor pressure vessel, and accordingly, cables for the control rod drive mechanisms are installed to penetrate through the nuclear reactor pressure vessel for supplying electric power from outside and transmitting/receiving a position signal of the control rod.

A reactor coolant for heat exchange circulates in the nuclear reactor pressure vessel. A penetration tube that penetrates through the nuclear reactor pressure vessel for installing cables has to be sealed so as to prevent leakage of the reactor coolant during driving of the nuclear reactor, and to do this, a cable sealing unit is installed in the nuclear reactor pressure vessel.

In order to replace the nuclear fuel, the nuclear reactor has to stop operating, and the control rod drive mechanisms and the cable sealing units exposed to the reactor coolant, which is a radioactive material, during the operation of the nuclear reactor have to be rapidly disassembled, assembled, and maintained.

FIGS. 1 and 2 show an example of an instrumentation and control penetration flange for a pressurized water reactor according to the related art.

Referring to FIGS. 1 and 2, a core 14 containing nuclear fuel is positioned on a lower portion in a reactor container 12, and a control rod drive mechanism (CRDM) is installed on an upper portion in the reactor container 12.

A penetration flange 44 (or sealing ring) having a loop shape is installed between an upper end flange 42 of the reactor container 12 and a head 22 covering the reactor container 12, and the CRDM is installed in the reactor container 12 separately from the penetration flange 44.

A plurality of ports 48 extending in a radial direction are formed in the penetration flange 44, and a utility conduit 50 is inserted in each of the plurality of ports 48 so that a cable may be inserted into the reactor container 12 via the utility conduit 50.

As described above, according to the related art illustrated in FIG. 1, the penetration flange 44 is installed between the reactor container 12 and the head 22 to be located adjacent to the upper end portion of the CRDM, and the cable independently penetrates through the penetration flange 44. Thus, cables occupy a large wiring space, and it is difficult to perform the installation and maintenance. Also, the CRDM and the penetration flange 44 are configured as separate devices, and thus, a simple structure for easily maintaining and repairing the CRDM exposed to radioactive material may not be obtained. In addition, it is difficult to independently replace the cable sealing unit and the CRDM, and thus, an operator may be exposed to high risk and the related art is not economically efficient.

SUMMARY

One or more embodiments include an installation structure for installing control rod drive mechanisms and cable sealing units in a nuclear reactor pressure vessel, wherein the installation structure has an integrated structure that makes assembling, disassembling, and maintenance of the control rod drive mechanisms and the cable sealing units easy and reduces working hours in a highly-radioactive region so as to improve safety and economic feasibility.

Additional aspects will be set forth in part in the description which follows and, in part, will be apparent from the description, or may be learned by practice of the presented embodiments.

According to one or more embodiments, an installation structure for installing control rod drive mechanisms and cable sealing units in a nuclear reactor pressure vessel, the installation structure includes: a sealing flange having a ring shape and being hermetically coupled between an upper pressure vessel and a lower pressure vessel of the nuclear reactor pressure vessel; a cylindrical tube extending downward vertically from an internal edge of the sealing flange; and a support plate provided horizontally to block a lower end portion of the cylindrical tube, wherein a plurality of mounting holes that penetrate through the sealing flange horizontally are arranged in the sealing flange with predetermined intervals therebetween along a circumferential direction, the cable sealing units are inserted and mounted in the plurality of mounting holes, and the control rod drive mechanisms are installed on the support plate to be supported.

A plurality of low temperature coolant passages that vertically penetrate through the sealing flange may be provided in the sealing flange with predetermined intervals therebetween along a circumferential direction.

A low temperature coolant passage connecting recess having a ring shape that connects upper portions of the plurality of low temperature coolant passages to one another and communicates with the plurality of low temperature coolant passages may be formed in an upper surface of the sealing flange.

A plurality of high temperature coolant passages may be formed in the support plate so as to vertically penetrate through the support plate.

The plurality of low temperature coolant passages may be located at an outer portion of the cylindrical tube, and the plurality of high temperature coolant passages may be located at an inner portion of the cylindrical tube.

A plurality of control rod driving shaft insertion holes, in which control rod driving shafts elevated by the control rod drive mechanisms are inserted, may be formed in the support plate so as to vertically penetrate through the support plate.

A plurality of installation recesses, in which a lower end portion of the control rod drive mechanism is inserted, may be formed in an upper surface of the support plate, and the control rod driving shaft insertion hole may be formed at a center portion of each of the plurality of installation recesses.

A plurality of cables may be led into the nuclear reactor pressure vessel through one cable sealing unit mounted in each of the plurality of mounting holes.

The cable sealing unit may include a penetration tube that is fixedly inserted in the mounting hole of the sealing flange, a thimble inserted to the penetration tube, and a guide tube inserted into the thimble, and the plurality of cables may be inserted to the guide tube.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
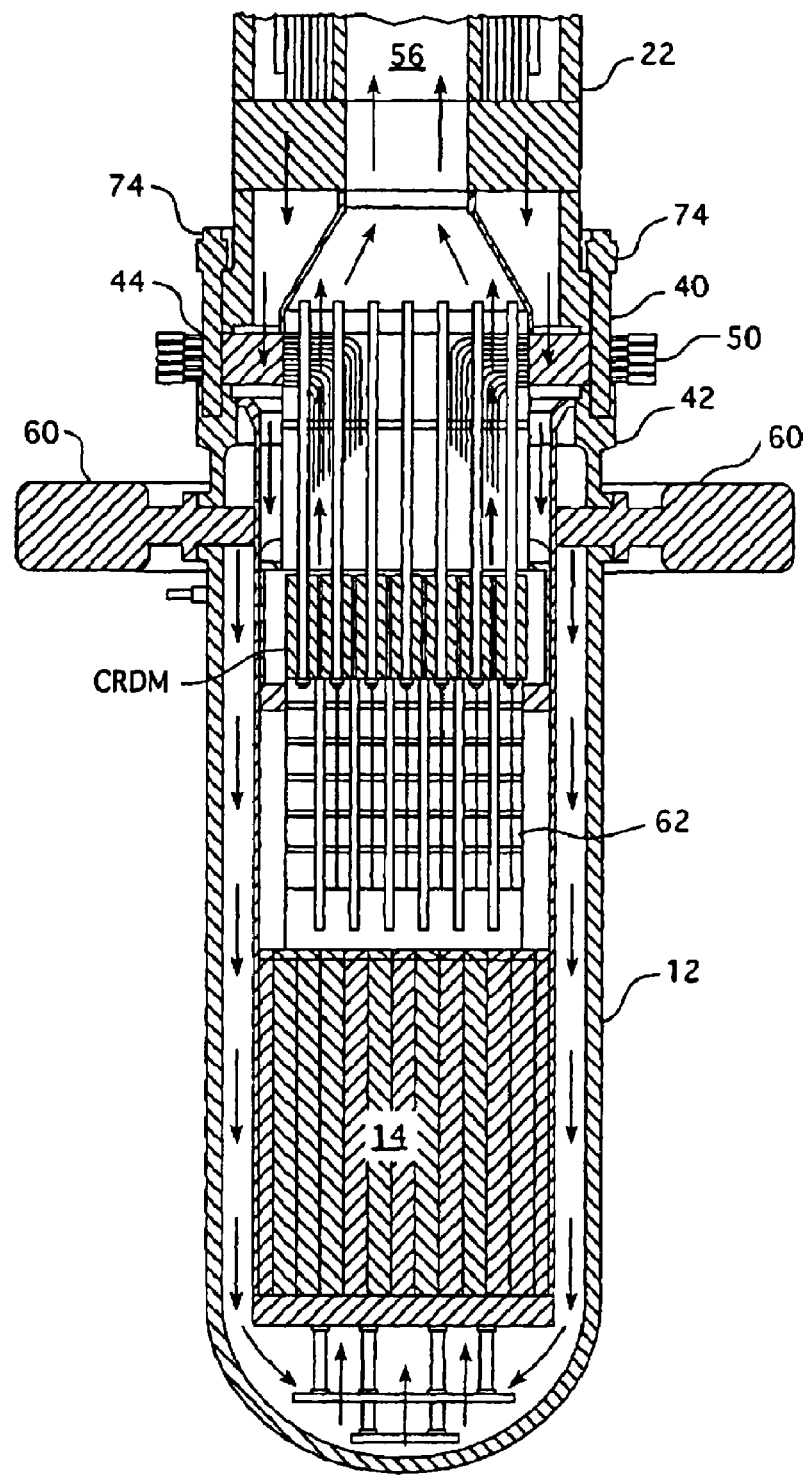
FIG. 1 is a diagram of an example of an instrumentation and control penetration flange for a pressurized water reactor according to the related art.
Figure 2:
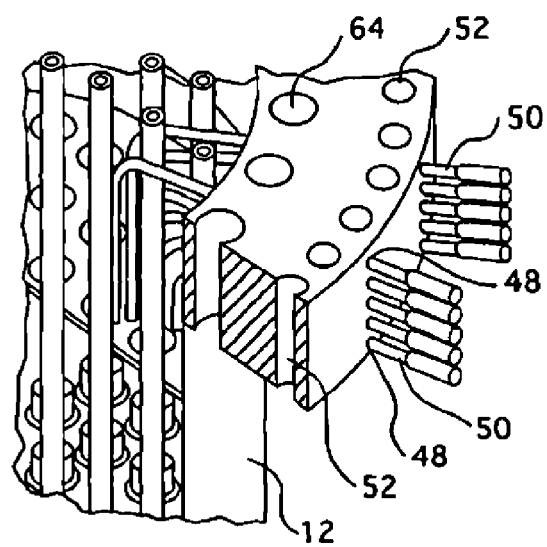
FIG. 2 is a partial perspective view of a penetration flange of FIG. 1.

Hereinafter, an installation structure for installing a control rod drive mechanism and a cable sealing unit in a nuclear reactor pressure vessel according to embodiments of the present disclosure will be described with reference to accompanying drawings. Throughout the specification, like reference numerals denote the same elements.

Figure 3:
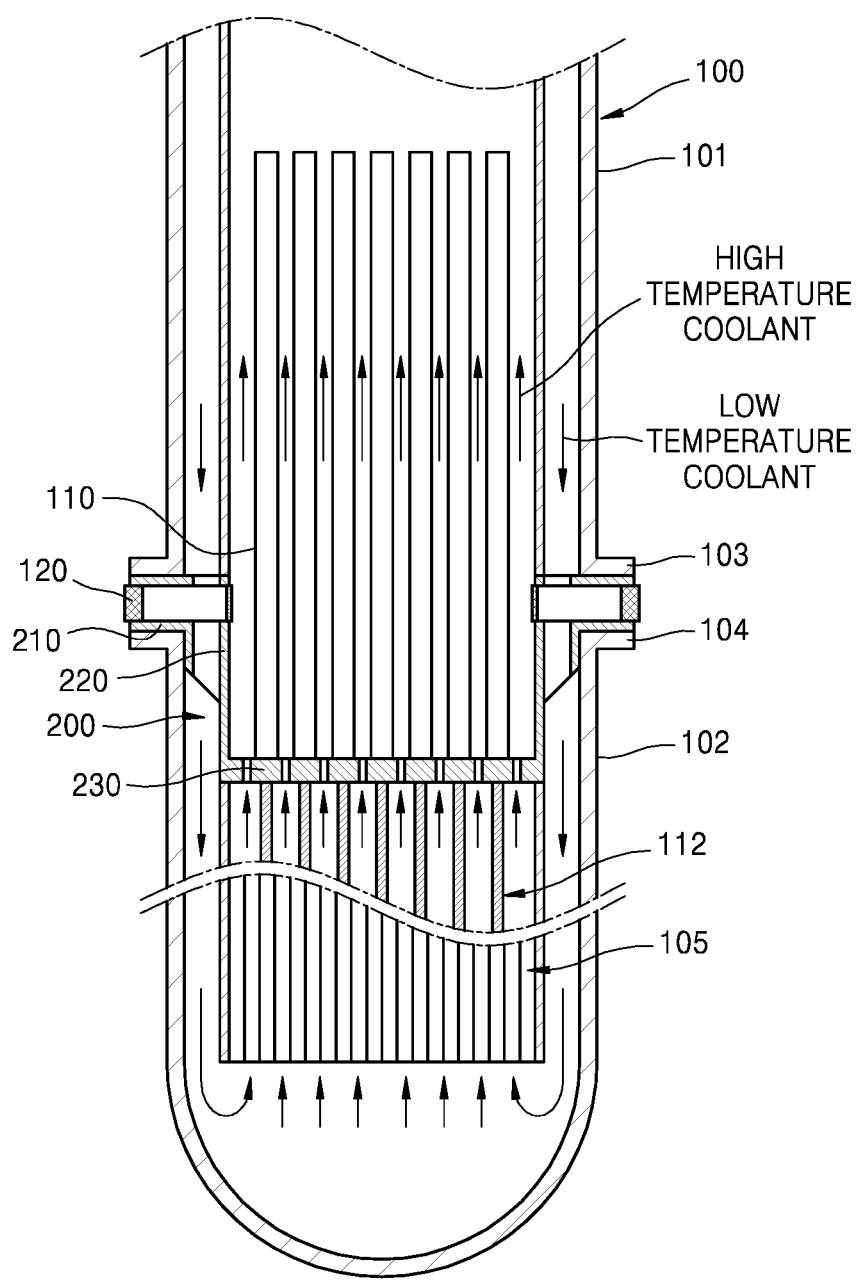
FIG. 3 is a cross-sectional view schematically showing a state in which an installation structure for installing a control rod drive mechanism and a cable sealing unit in a nuclear reactor pressure vessel is installed in the nuclear reactor pressure vessel, according to an embodiment of the present disclosure.
Figure 4:
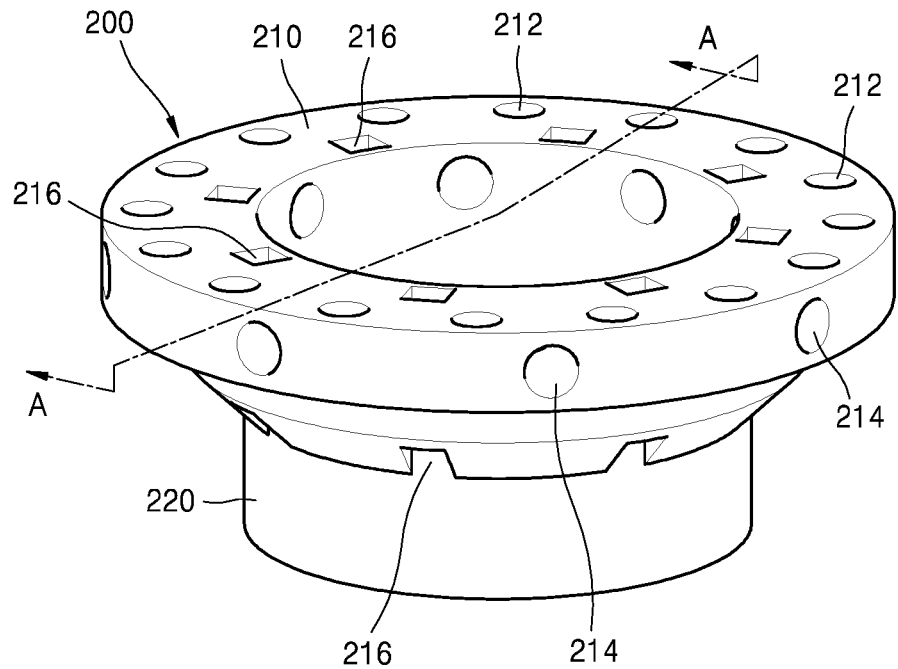
FIG. 4 is a perspective view of the installation structure of FIG. 3.
Figure 5:
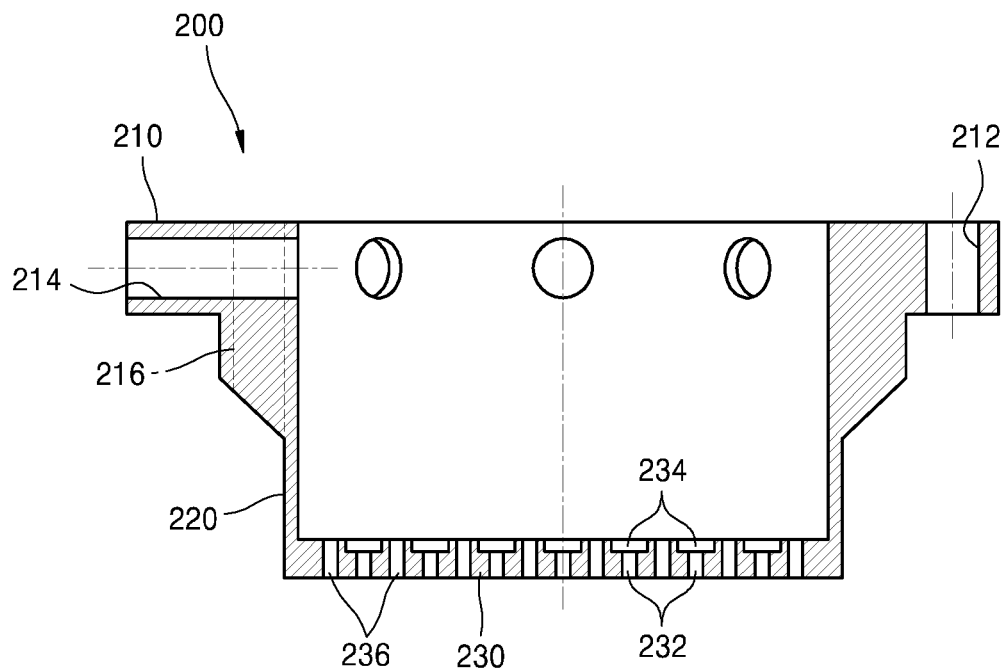
FIG. 5 is a cross-sectional view of the installation structure taken along a line A-A of FIG. 4.

FIG. 3 is a cross-sectional view schematically showing a state in which an installation structure 200 for installing a control rod drive mechanism 110 and a cable sealing unit 120 in a nuclear reactor pressure vessel 100 is installed in the nuclear reactor pressure vessel 100, FIG. 4 is a perspective view of the installation structure 200 of FIG. 3, and FIG. 5 is a cross-sectional view of the installation structure 200 taken along a line A-A of FIG. 4.

Referring to FIGS. 3 to 5, the installation structure 200 according to the present embodiment is a structure for installing the control rod drive mechanism 110 and the cable sealing unit 120 in the nuclear reactor pressure vessel 100.

The installation structure 200 according to the present embodiment may be applied to the nuclear reactor pressure vessel 100 of a mid-flange type. The nuclear reactor pressure vessel 100 of the mid-flange type is divided into an upper pressure vessel 101 and a lower pressure vessel 102, and the upper pressure vessel 101 and the lower pressure vessel 102 are hermetically coupled to each other via an upper flange 103 positioned on a lower end portion of the upper pressure vessel 101 and a lower flange 104 positioned on an upper end portion of the lower pressure vessel 102.

A core containing a nuclear fuel 105 is positioned in the nuclear reactor pressure vessel 100, and the control rod drive mechanism 110 is positioned above the core. The control rod drive mechanism 110 is a device for vertically elevating a control rod driving shaft 112 coupled to an upper end portion of a control rod (not shown). The control rod drive mechanism 110 is installed on the installation structure 200 according to the present embodiment to be supported, and this will be described below in detail.

The installation structure 200 according to the present embodiment is installed between the upper pressure vessel 101 and the lower pressure vessel 102 of the nuclear reactor pressure vessel 100. Therefore, the installation structure 200 is located at a middle portion in a height direction of the nuclear reactor pressure vessel 100.

The installation structure 200 according to the present embodiment includes a sealing flange 210, a cylindrical tube 220, and a support plate 230.

The sealing flange 210 has a ring shape and is installed between the upper pressure vessel 101 and the lower pressure vessel 102 of the nuclear reactor pressure vessel 100, in more detail, between the upper flange 103 and the lower flange 104. The sealing flange 210 is firmly coupled to the upper flange 103 and the lower flange 104 to seal a gap between the upper pressure vessel 101 and the lower pressure vessel 102 of the nuclear reactor pressure vessel 100. To do this, a plurality of coupling holes 212 penetrating through the sealing flange 210 in a vertical direction are arranged in the sealing flange 210 with predetermined intervals therebetween along a circumferential direction. A coupling unit, for example, a plurality of bolts (not shown), may be firmly coupled to the upper flange 103 and the lower flange 104 via the plurality of coupling holes 212. In addition, a unit for preventing leakage of the coolant in the nuclear reactor pressure vessel 100, for example, O-rings (not shown), may be provided on upper and lower surfaces of the sealing flange 210.

A plurality of mounting holes 214 penetrating through the sealing flange 210 in a horizontal direction are radially arranged with predetermined intervals therebetween in an outer circumferential surface of the sealing flange 210. The cable sealing unit 120 is inserted into each of the plurality of mounting holes 214, and this will be described later with reference to FIGS. 10 and 11.

In addition, a plurality of low temperature coolant passages 216 penetrating through the sealing flange 210 in a vertical direction are arranged in the sealing flange 210 with predetermined intervals therebetween along the circumferential direction.

The plurality of low temperature coolant passages 216 are provided in the sealing flange 210 at a portion located inside the nuclear reactor pressure vessel 100, and a low temperature coolant flowing in the nuclear reactor pressure vessel 100 flows downward after passing through the plurality of low temperature coolant passages 216. Each of the plurality of low temperature coolant passages 216 may have a square-shaped cross-section as shown in FIG. 4, but is not limited thereto, that is, they may have a circular cross-section.

The cylindrical tube 220 may extend a predetermined distance downward from an internal edge of the sealing flange 210 in a vertical direction. A length of the cylindrical tube 220 is determined based on cable wirings.

The cylindrical tube 220 connects the support plate 230 that will be described later to the sealing flange 210. The sealing flange 210, the cylindrical tube 220, and the support plate 230 may be connected to one another by a welding process, but are not limited thereto. In addition, the cylindrical tube 220 may function as a separation wall for separating the low temperature coolant passing through the plurality of low temperature coolant passages 216 formed in the sealing flange 210 from the high temperature coolant passing through a plurality of high temperature coolant passages 236 formed in the support plate 230 that will be described later. That is, the low temperature coolant passages 216 are provided on an external portion of the cylindrical tube 220 and the high temperature coolant passages 236 are provided on an internal portion of the cylindrical tube 220, and thus, the low temperature coolant and the high temperature coolant are separate from each other based on the cylindrical tube 220 and thus flow in opposite directions.

The support plate 230 is provided to block a lower end portion of the cylindrical tube 220. The support plate 230 may be installed at the lower end portion of the cylindrical tube 220 by a welding process, but is not limited thereto. The control rod drive mechanism 110 is installed on the support plate 230 to be supported. This will be described later with reference to FIGS. 8 and 9.

The plurality of high temperature coolant passages 236 penetrate through the support plate 230 in a vertical direction as described above. The high temperature coolant flowing in the nuclear reactor pressure vessel 100 flows upward by passing through the plurality of high temperature coolant passages 236.

Figure 6:
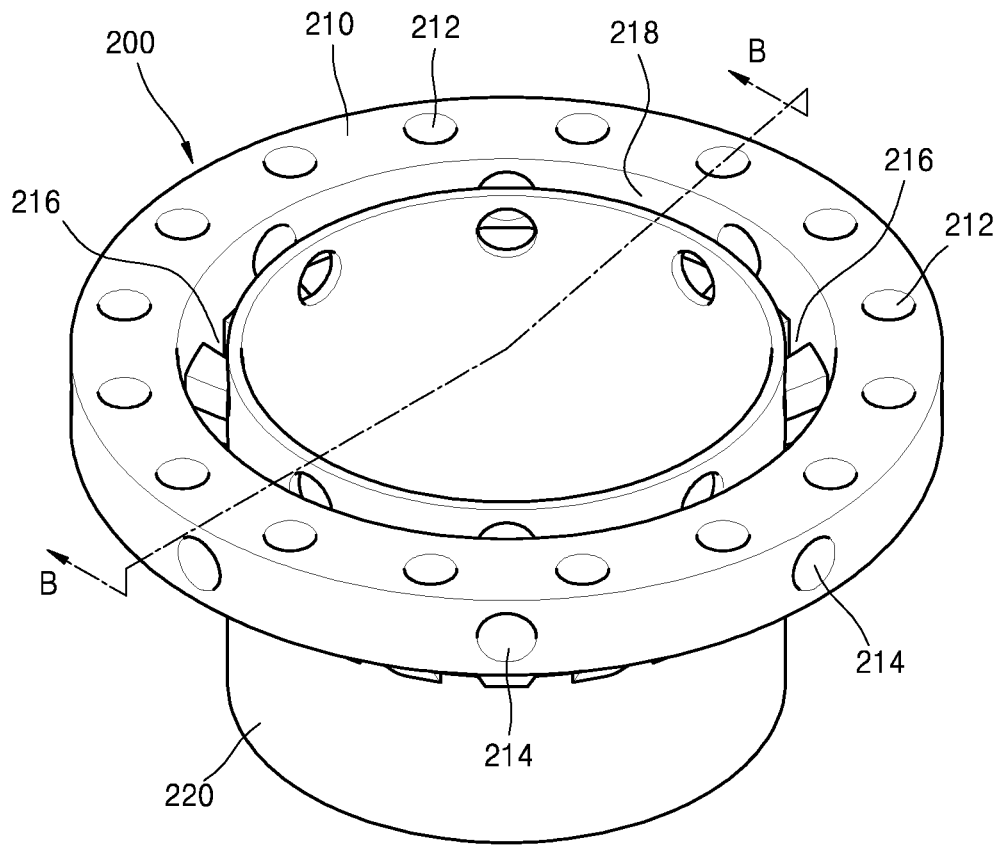
FIG. 6 is a perspective view showing a modified example of the installation structure of FIG. 4.
Figure 7:
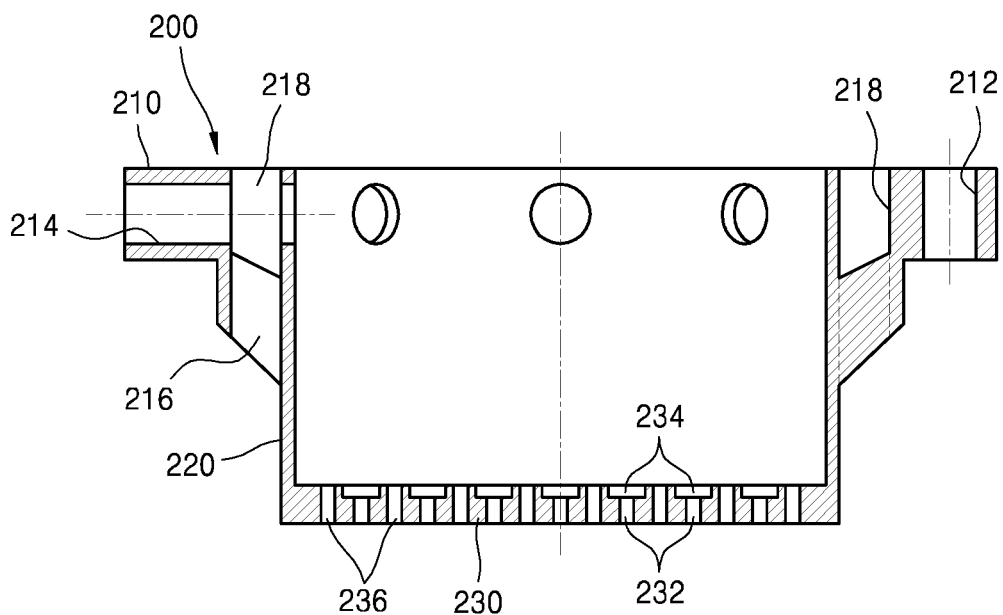
FIG. 7 is a cross-sectional view of the installation structure taken along a line B-B of FIG. 6.

FIG. 6 is a perspective view showing a modified example of the installation structure 200 of FIG. 4, and FIG. 7 is a cross-sectional view of the installation structure taken along a line B-B of FIG. 6.

The installation structure 200 shown in FIGS. 6 and 7 is identical with the structure of the installation structure shown in FIGS. 4 and 5 except for the structure of the low temperature coolant passage, and thus, only differences between the installation structures will be described hereinafter.

Referring to FIGS. 6 and 7, a low temperature coolant passage connecting recess 218 having a ring shape is formed to a predetermined depth in an upper surface of the sealing flange 210 for connecting upper portions of the plurality of low temperature coolant passages 216 to one another. The low temperature coolant passage connecting recess 218 is connected to the plurality of low temperature coolant passages 216. That is, the plurality of low temperature coolant passages 216 are formed in a bottom surface of the low temperature coolant passage connecting recess 218.

According to the above structure, the passage in which the low temperature coolant flows may be ensured as much as possible, and a weight of the installation structure 200 may be reduced.

Figure 8:
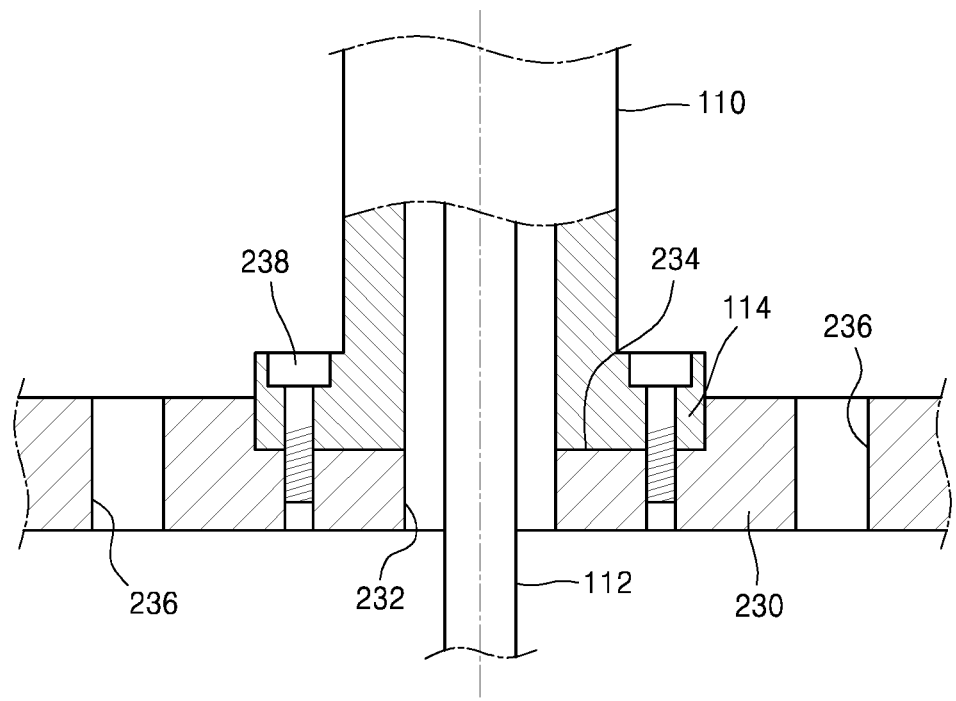
FIG. 8 is a partial cross-sectional view schematically showing a structure in which a control rod drive mechanism of FIG. 3 is coupled to a support plate of the installation structure of FIG. 5.

FIG. 8 is a partial cross-sectional view schematically showing a structure in which the control rod drive mechanism 110 of FIG. 3 is coupled to the support plate 230 of the installation structure 200 of FIG. 5.

Referring to FIG. 8, the control rod drive mechanism 110 is a device for elevating the control rod driving shaft 112 connected to the control rod (not shown). In the present disclosure, the control rod drive mechanism 110 is installed on the support plate 230 of the installation structure 200 to be supported.

In detail, a lower end portion of the control rod drive mechanism 110 is fixedly installed on the support plate 230. To do this, a flange 114 may be provided at the lower end portion of the control rod drive mechanism 110, and a plurality of installation recesses 234 in which the flange 114 at the lower end portion of the control rod drive mechanism 110 are inserted to a predetermined depth are formed in the upper surface of the support plate 230. The control rod drive mechanism 110 may be fixedly installed on the support plate 230 by a fixing unit, e.g., a bolt 238, in a state in which the flange 114 at the lower end portion of the control rod drive mechanism 110 is inserted in the installation recesses 234. In addition, besides the plurality of high temperature coolant passages 236, a plurality of control rod driving shaft insertion holes 232, in which the control rod driving shaft 112 is inserted, penetrate through the support plate 230 in the vertical direction, and the control rod driving shaft 112 may elevate through the control rod driving shaft insertion holes 232. The control rod driving shaft insertion hole 232 is formed at a center portion of the installation recess 234.

A detailed coupling structure between the control rod drive mechanism 110 and the support plate 230 above is just an example, and may vary depending on the structure of the control rod drive mechanism 110.

Figure 9:
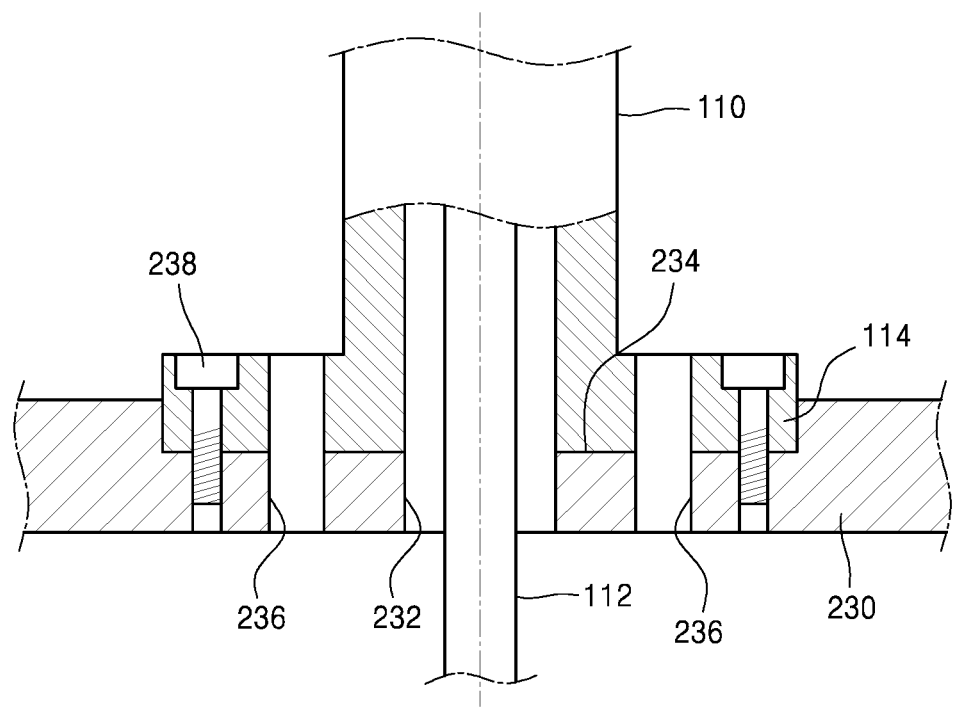
FIG. 9 is a partial cross-sectional view showing an example in which a high temperature coolant passage of FIG. 8 is installed at a different location.

FIG. 9 is a partial cross-sectional view showing an example in which a high temperature coolant passage 236 of FIG. 8 is installed at a different location.

Referring to FIG. 9, the plurality of high temperature coolant passages 236 may be provided at the location where the control rod drive mechanism 110 is installed. In detail, the plurality of high temperature coolant passages 236 may be provided to penetrate through the support plate 230 in the vertical direction at the location where the installation recess 234 is formed. Here, the plurality of high temperature coolant passages 236 may also vertically penetrate through the flange 114 at the lower end portion of the control rod drive mechanism 110.

Alternatively, the plurality of high temperature coolant passages 236 may be also provided at the location illustrated in FIG. 8, in addition to the location of FIG. 9.

Figure 10:
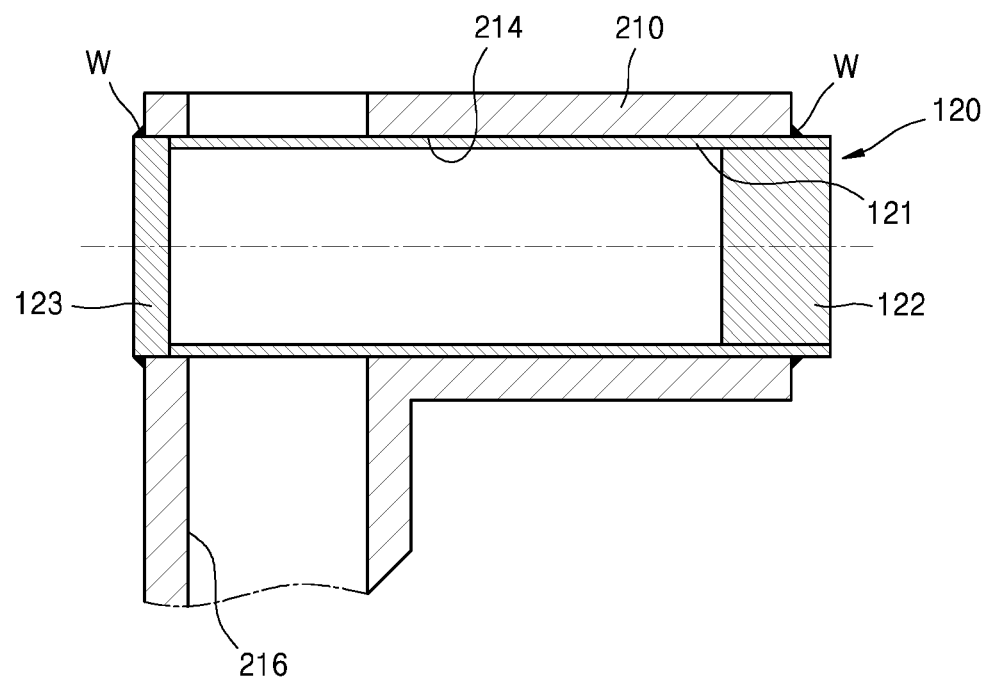
FIG. 10 is a partial cross-sectional view schematically showing a state in which the cable sealing unit of FIG. 3 is coupled to a sealing flange of the installation structure of FIG. 5.
Figure 11:
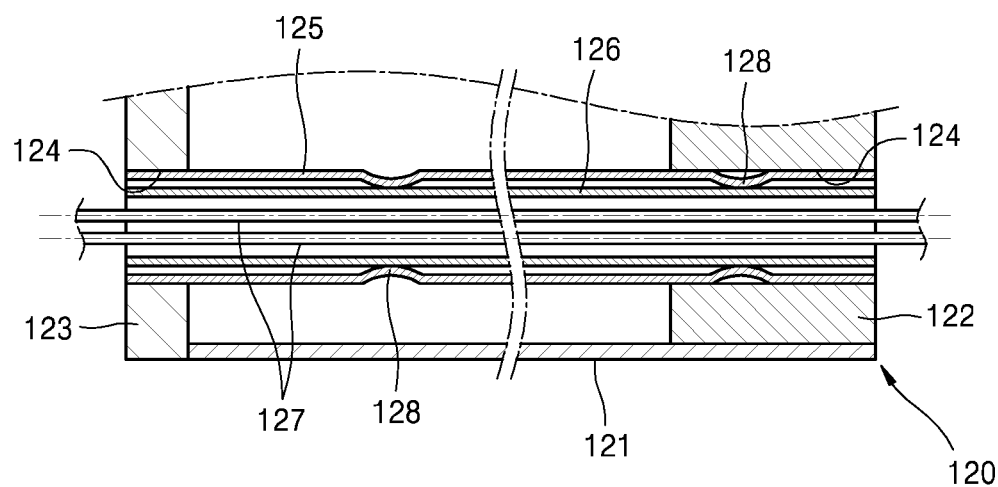
FIG. 11 is a schematic cross-sectional view of the cable sealing unit of FIG. 10.

FIG. 10 is a partial cross-sectional view schematically showing a state in which the cable sealing unit 120 of FIG. 3 is coupled to the sealing flange 210 of the installation structure 200 of FIG. 5, and FIG. 11 is a schematic cross-sectional view of the structure of the cable sealing unit 120 of FIG. 10.

Referring to FIG. 10, the cable sealing unit 120 is inserted and mounted to each of the plurality of mounting holes 214 that penetrate through the sealing flange 210.

The cable sealing unit 120 includes a penetration tube 121 that is fixedly inserted into the mounting hole 214 of the sealing flange 210, and the penetration tube 121 includes an external end portion 122 and an internal end portion 123 blocking opposite ends thereof. The penetration tube 121 may be fixed to the sealing flange 210 by a welding process (W) in a state of being inserted in the mounting hole 214.

Referring to FIG. 11, a thimble insertion hole 124 that penetrates through the external end portion 122 and the internal end portion 123 of the penetration tube 121 is formed, and a thimble 125 is inserted and installed in the thimble insertion hole 124. A guide tube 126 is inserted in the thimble 125, and at least one cable, e.g., a plurality of cables 127 are inserted in the guide tube 126 as a bundle. A plurality of protrusions 128 that are convex inward are formed from the thimble 125 to support the guide tube 126 not to be shaken.

The cable 127 supplies electric power to the control rod drive mechanism 110 in the nuclear reactor pressure vessel 100 and transmits and receives control signals and location signals. In addition, although not shown in the drawings, a swagelok may be installed on an outer portion of the penetration tube 121 in order to finally seal the penetration tube 121. Since the swagelok is well known in the art, detailed descriptions thereof are omitted.

In addition, one thimble 125 is installed penetrating through one cable sealing unit 120 in FIG. 11, but two or more thimbles 125 may be installed penetrating through one cable sealing unit 120, and at least one, for example, a plurality of cables 127 may be inserted in a bundle into each of the two or more thimbles 125. That is, according to the present disclosure, the plurality of cables 127 may be led in the nuclear reactor pressure vessel 100 via each of the plurality of mounting holes 214 that penetrate through the sealing flange 210.

As described above, the installation structure 200 according to the present disclosure has a structure, in which the control rod drive mechanism 110 and the cable sealing unit 120 may be inserted together in the nuclear reactor pressure vessel 100, and thus, assembling, disassembling, and maintenance operations of the control rod drive mechanism 110 and the cable sealing unit 120 may be performed easily and collectively, working hours in a high-radioactive region may be reduced, and the control rod drive mechanism 110 and the cable sealing unit 120 may be independently replaced and thus economically efficient.

Also, since the installation structure 200 is located at a middle portion in a height direction of the nuclear reactor pressure vessel 100, that is, at a location where the cables 127 of the control rod drive mechanism 110 are wired, wiring distances of the plurality of cables 127 may be reduced and spatial efficiency may be improved.

Also, since the plurality of cables 127 are configured to penetrate through the sealing flange 210 of the installation structure 200 in a bundle, easiness in wiring and maintaining the plurality of cables 127 may be improved. Since the number of mounting holes 214 in which the cable sealing unit 120 is mounted may be reduced, it may be easy to maintain a pressure boundary and a flow resistance of the reactor coolant may be reduced in the nuclear reactor pressure vessel 100.

In addition, since the plurality of low temperature coolant passages 216 and the plurality of high temperature coolant passages 236 are provided in the installation structure 200, the reactor coolant may sufficiently circulate in the nuclear reactor pressure vessel 100.

According to the present disclosure, the installation structure for installing the control rod drive mechanism and the cable sealing unit in the nuclear reactor pressure vessel is integrally configured, and thus, the control rod drive mechanism and the cable sealing unit may be separated and moved at once from the nuclear reactor pressure vessel to be disassembled, assembled, and maintained in a separate and safe place. In addition, working hours in a highly-radioactive region may be reduced, an operator's exposure to radiation may be reduced and economic efficiency may be improved.

Also, since the installation structure is located at a height where the cables are wired in the control rod drive mechanism and a plurality of cables penetrate through the sealing flange of the installation structure in a bundle, wiring distances of the plurality of cables may be reduced, and thus, a spatial efficiency may be improved and easiness in wiring and maintaining of the cables may be improved.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. An installation structure for installing control rod drive mechanisms and cable sealing units in a nuclear reactor pressure vessel, the installation structure comprising:
    a sealing flange having a ring shape and being hermetically coupled between an upper pressure vessel and a lower pressure vessel of the nuclear reactor pressure vessel;
    a cylindrical tube extending downward vertically from an internal edge of the sealing flange; and
    a support plate provided horizontally to block a lower end portion of the cylindrical tube,
    wherein a plurality of mounting holes that penetrate through the sealing flange horizontally are arranged in the sealing flange with predetermined intervals therebetween along a circumferential direction, the cable sealing units are inserted and mounted in the plurality of mounting holes, and the control rod drive mechanisms are installed on the support plate to be supported,
    wherein a plurality of low temperature coolant passages that vertically penetrate through the sealing flange are provided in the sealing flange with predetermined intervals therebetween along a circumferential direction, and
    wherein a low temperature coolant passage connecting recess having a ring shape that connects upper portions of the plurality of low temperature coolant passages to one another and communicates with the plurality of low temperature coolant passages is formed in an upper surface of the sealing flange.

2. The installation structure of claim 1, wherein a plurality of high temperature coolant passages are formed in the support plate so as to vertically penetrate through the support plate.

3. The installation structure of claim 2, wherein the plurality of low temperature coolant passages are located at an outer portion of the cylindrical tube, and the plurality of high temperature coolant passages are located at an inner portion of the cylindrical tube.

4. The installation structure according to claim 1, wherein a plurality of control rod driving shaft insertion holes, in which control rod driving shafts elevated by the control rod drive mechanisms are inserted, are formed in the support plate so as to vertically penetrate through the support plate.

5. The installation structure of claim 4, wherein a plurality of installation recesses, in which a lower end portion of the control rod drive mechanism is inserted, are formed in an upper surface of the support plate, and the control rod driving shaft insertion hole is formed at a center portion of each of the plurality of installation recesses.

6. The installation structure according to claim 1, wherein a plurality of cables are led into the nuclear reactor pressure vessel through one cable sealing unit mounted in each of the plurality of mounting holes.

7. The installation structure of claim 6, wherein the cable sealing unit comprises a penetration tube that is fixedly inserted in the mounting hole of the sealing flange, a thimble inserted to the penetration tube, and a guide tube inserted into the thimble, and the plurality of cables are inserted to the guide tube.

* * * * *